(12) United States Patent
Lee et al.

(10) Patent No.: US 10,579,181 B2
(45) Date of Patent: Mar. 3, 2020

(54) DISPLAY DEVICE

(71) Applicant: Samsung Display Co., Ltd., Yongin-si (KR)

(72) Inventors: Tae Hee Lee, Yongin-si (KR); Won Ki Hong, Yongin-si (KR); Rang Kyun Mok, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 148 days.

(21) Appl. No.: 15/839,770

(22) Filed: Dec. 12, 2017

(65) Prior Publication Data

US 2018/0210600 A1 Jul. 26, 2018

(30) Foreign Application Priority Data

Jan. 24, 2017 (KR) .......................... 10-2017-0011166

(51) Int. Cl.
*G06F 3/041* (2006.01)
*G06F 21/31* (2013.01)
*G06F 3/0488* (2013.01)
*G06K 9/00* (2006.01)
*G06F 3/044* (2006.01)
(Continued)

(52) U.S. Cl.
CPC ............ *G06F 3/0414* (2013.01); *G06F 3/044* (2013.01); *G06F 3/0416* (2013.01); *G06F 3/0488* (2013.01); *G06F 21/31* (2013.01); *G06F 21/36* (2013.01); *G06K 9/00013* (2013.01); *G06K 9/22* (2013.01); *G06F 3/0412* (2013.01); *G06F 2203/04102* (2013.01);
(Continued)

(58) Field of Classification Search
CPC ...... G06F 3/0414; G06F 3/0488; G06F 3/044; G06F 3/0416; G06F 2203/04106; G06F 2203/04102; G06F 21/31; G06F 3/0412; G06F 2203/04112; G06F 2203/04105; G06F 21/36; G06K 9/00013; G06K 9/22
See application file for complete search history.

(56) References Cited

U.S. PATENT DOCUMENTS 9,063,583 B2 6/2015 Kim et al.
9,342,105 B2 5/2016 Choi et al.
(Continued)

FOREIGN PATENT DOCUMENTS

KR 10-2006-0073293 6/2006
KR 10-1210473 12/2012
(Continued)

*Primary Examiner* — Muhammad N Edun
(74) *Attorney, Agent, or Firm* — H.C. Park & Associates, PLC

(57) ABSTRACT

A display device includes: a display panel including a display area including at least a partially curved surface area; a touch sensor overlapping the display area to acquire touch information on a touch of a user; a pressure sensor to sense a pressure of the touch; and a controller configured to perform user authentication by controlling the display panel, the touch sensor, and the pressure sensor, wherein the touch sensor includes a plurality of sensor pixels that senses a change in capacitance corresponding to the touch, wherein the pressure sensor includes: a first electrode; a second electrode spaced apart from the first electrode; and a pressure sensing element provided between the first electrode and the second electrode.

17 Claims, 7 Drawing Sheets

(51) Int. Cl.
*G06F 21/36* (2013.01)
*G06K 9/22* (2006.01)
(52) U.S. Cl.
CPC .............. *G06F 2203/04105* (2013.01); *G06F 2203/04106* (2013.01); *G06F 2203/04112* (2013.01)

(56) References Cited

U.S. PATENT DOCUMENTS

| | | | |
|---|---|---|---|
| 9,547,789 | B2 | 1/2017 | Park et al. |
| 9,626,029 | B2 | 4/2017 | Park et al. |
| 9,672,408 | B2 | 6/2017 | Johansson |
| 2016/0026219 | A1* | 1/2016 | Kim .................. H04M 1/0245 345/173 |
| 2016/0162093 | A1 | 6/2016 | Kim et al. |
| 2016/0179338 | A1 | 6/2016 | Miller |
| 2016/0321442 | A1 | 11/2016 | Song et al. |
| 2016/0378256 | A1 | 12/2016 | Lee et al. |
| 2017/0031504 | A1* | 2/2017 | Hwang ................. G06F 3/0488 |
| 2017/0371462 | A1 | 12/2017 | Kim et al. |
| 2018/0225547 | A1 | 8/2018 | Kim et al. |

FOREIGN PATENT DOCUMENTS

| | | |
|---|---|---|
| KR | 10-2014-0147647 | 12/2014 |
| KR | 10-2015-0092524 | 8/2015 |
| KR | 10-2016-0027878 | 3/2016 |
| KR | 10-1617872 | 5/2016 |
| KR | 10-2016-0068439 | 6/2016 |
| KR | 10-2016-0071887 | 6/2016 |
| KR | 10-2016-0128702 | 11/2016 |
| KR | 10-2018-0001677 | 1/2018 |
| KR | 10-2018-0091998 | 8/2018 |
| WO | 2015/169190 | 11/2015 |

* cited by examiner

DISPLAY DEVICE

CROSS-REFERENCE TO RELATED APPLICATION

This application claims priority from and the benefit of Korean Patent Application No. 10-2017-0011166, filed on Jan. 24, 2017, which is hereby incorporated by reference for all purposes as if fully set forth herein.

BACKGROUND

Field

The invention relates generally to a display device, and more particularly, to a display device capable of recognizing touch information and touch pressure.

Discussion of the Background

As interest in information displays and demand for portable information media increase, research and commercialization has centered on display devices.

Recent display devices include touch sensors for receiving touch inputs of users in addition to image display functions. Accordingly, the users can more conveniently use the display devices through the touch sensors. In addition, display devices that have curved and/or flexible or elastic surfaces that are bendable or foldable have been introduced to the market and are gaining popularity.

The above information disclosed in this Background section is only for enhancement of understanding of the background of the inventive concepts, and, therefore, it may contain information that does not constitute prior art.

SUMMARY

Display devices constructed according to the principle of the invention are capable of recognizing both touch information (e.g., a fingerprint) and touch pressure, even in a display having curved surfaces.

Additional aspects will be set forth in the detailed description which follows, and, in part, will be apparent from the disclosure, or may be learned by practice of the inventive concepts.

According to one aspect of the invention, a display device constructed according to the principles of the invention includes: a display panel including a display area including at least a partially curved surface area; a touch sensor overlapping the display area to acquire touch information on a touch of a user; a pressure sensor to sense a pressure of the touch; and a controller configured to perform user authentication by controlling the display panel, the touch sensor, and the pressure sensor, wherein the touch sensor includes a plurality of sensor pixels that senses a change in capacitance corresponding to the touch, wherein the pressure sensor includes: a first electrode; a second electrode spaced apart from the first electrode; and a pressure sensing element provided between the first electrode and the second electrode.

The resistance of the pressure sensing element may be changed based on the pressure.

The pressure sensing element may be a quantum tunneling composite (QTC).

The touch information may include information on at least one part of a user selected from the group of lines of a knuckle of the user, lines of a palm of the user, a fingerprint of the user, and a position of the touch of the user.

The at least one part may include at least two parts with at least one of the two parts being sensed from spaced curved locations on the display.

The pressure sensor may sense a contact surface touched by the user and acquires pressure information of the contact surface and the controller may include a user recognition unit performing user authentication, based on the touch information and the pressure information.

The user recognition unit may perform the user authentication, based on the touch information and the pressure information, which are acquired through the curved surface area in the display area.

The user recognition unit may perform the user authentication by comparing the touch information with previously registered touch information and comparing the pressure information with previously registered pressure information.

The display device may further include a memory to store the previously registered touch information of the user and the previously registered pressure information of the user.

The controller may control whether the display device is available through the user authentication.

The touch sensor may further include: a sensor scan driver supplying a sensor scan signal to sensor scan lines connected to the sensor pixels; and a read-out circuit recognizing the touch information by using a current output through output lines connected to the sensor pixels.

The pressure sensor may further include: a pressure sensor driving unit to supply a driving signal to the first electrode; and a pressure sensing unit to sense a change in resistance of the pressure sensing element.

The touch sensor may be provided on a curved surface of the display panel, and the pressure sensor may be provided on the touch sensor.

The pressure sensor may be provided on a curved surface of the display panel, and the touch sensor may be provided on the pressure sensor.

The display panel may be provided between the touch sensor and the pressure sensor.

The display panel may include a first substrate and a second substrate that faces the first substrate.

The sensor pixels may be directly formed on the second substrate.

The first electrode may be directly formed on the second substrate.

The display device may further include a window member provided on the display panel.

The sensor pixels may be directly formed on the window member.

According to the principles and exemplary embodiments of the invention, the touch sensor and the pressure sensor are integrated together to provide improved sensitivity in a curved surface area of the display panel, thereby ensuring a more stable and uniform sensing.

Further, user authentication can be performed by sensing a touch and a pressure in the curved surface area.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

DETAILED DESCRIPTION OF THE ILLUSTRATED EMBODIMENTS

Figure 1:
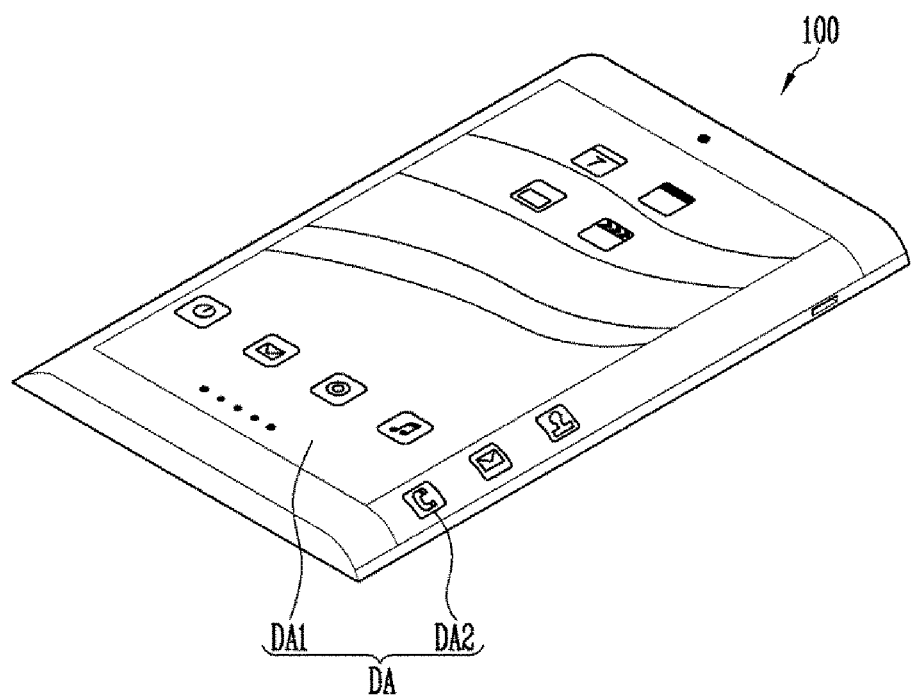
FIG. 1 is a perspective view of an embodiment of a display device constructed according to the principles of the invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

Unless otherwise specified, the illustrated exemplary embodiments are to be understood as providing exemplary features of varying detail of various exemplary embodiments. Therefore, unless otherwise specified, the features, components, modules, layers, films, panels, regions, and/or aspects of the various illustrations may be otherwise combined, separated, interchanged, and/or rearranged without departing from the disclosed exemplary embodiments. Further, in the accompanying figures, the size and relative sizes of layers, films, panels, regions, etc., may be exaggerated for clarity and descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. Further, the x-axis, the y-axis, and the z-axis are not limited to three axes of a rectangular coordinate system, and may be interpreted in a broader sense. For example, the x-axis, the y-axis, and the z-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Hereinafter, exemplary embodiments of the display devices and components thereof constructed according to the principles of the invention will be described in detail with reference to the accompanying drawings.

Figure 2A:
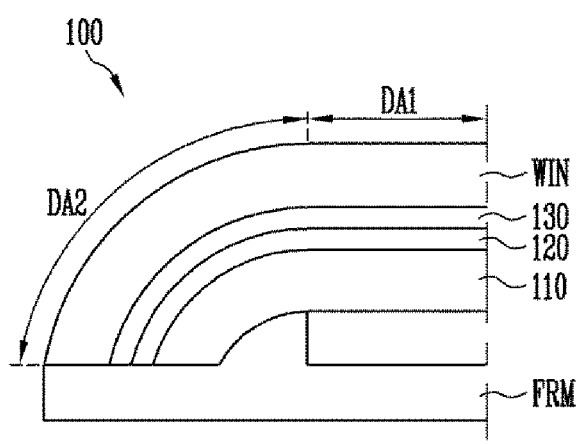
FIG. 2A is a partial sectional view of the display device shown in FIG. 1.
Figure 2B:
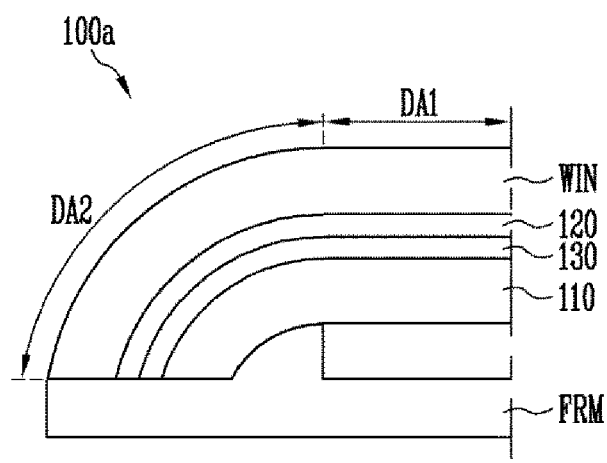
FIGS. 2B and 2C are partial sectional views of display devices according to other exemplary embodiments.
Figure 2C:
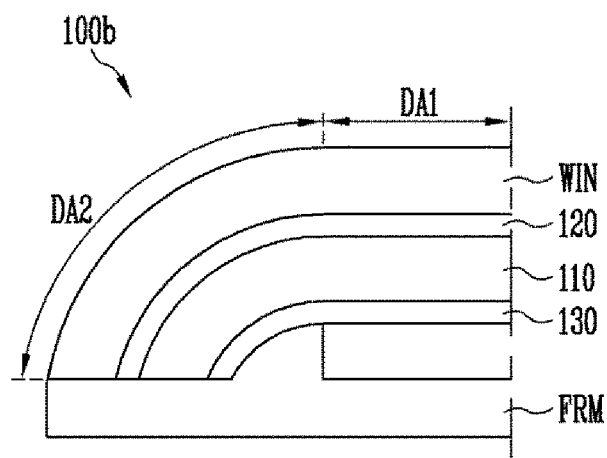

FIG. 1 is a perspective view of an embodiment of a display device constructed according to the principles of the invention. FIG. 2A is a partial sectional view of the display device shown in FIG. 1. FIGS. 2B and 2C are partial sectional views of display devices according to other exemplary embodiments.

Referring to FIG. 1, the display device 100 may be implemented as a portable terminal such as a smart phone. The display device 100 may include a curved display panel having curved side areas. The display device 100 includes a display area DA in which an image is displayed, and the display area DA may be divided into a flat surface area DA1 corresponding to a flat area and curved surface areas DA2 corresponding to curved areas. However, this exemplary embodiment is illustrative, and the structure, shape, and number of the curved surface areas DA2 may be variously modified, if necessary.

Referring to FIG. 2A, the display device 100 may include a touch sensor 120 provided on a display panel 110, a pressure sensor 130 provided on the touch sensor 120, a window member WIN provided on the pressure sensor 130, and a frame part FRM.

The display panel 110 displays an image on at least one surface thereof. The display panel 110 includes at least a partial curved surface area DA2. The curved surface area DA2 is an area having a predetermined curvature when the display panel 110 is viewed on a section. The display area DA of the display panel 110 may include the flat surface area DA1 and the curved surface area DA2. However, in another exemplary embodiment, the display panel 110 may have an entirely curved shape. In this case, the entire display area DA may be a curved surface area. In still another exemplary embodiment, the display panel 110 may be a flexible display panel entirely or partially having flexibility. In this case, a partial area of the display panel 110 may be temporarily flat or curved, and accordingly, the size and curved degree of the curved surface area DA2 may be variable.

The display panel 110 is not particularly limited as long as it can display an image. For example, the display panel 110 may include an organic light emitting display panel, a liquid crystal display panel, an electrophoretic display panel, an electrowetting display panel, a MEMS display panel, and the like.

The touch sensor 120 corresponds to the display area DA, and acquires touch information on a touch of a user. Here, the touch information may include information on at least one of lines of a knuckle of the user, lines of a palm of the user, a fingerprint of the user, and a position of the touch of the user. For example, the touch may be generated by a finger, a palm, or the like, which is a portion of the body of the user, and an object to be sensed by the touch sensor 120 may include at least one of lines of a knuckle of the user, lines of a palm of the user, and a fingerprint of the user. The lines of the knuckle of the user, the lines of the palm of the user, and the fingerprint of the user may include valleys and ridges.

In this exemplary embodiment, the touch sensor 120 is located on the display panel 110, and may be provided in a shape corresponding to that of the display panel 110. Therefore, the touch sensor 120 a flat area corresponding to the flat surface area DA1 and a curved area corresponding to the curved surface area DA2.

The pressure sensor 130 senses a touch pressure of the user. For example, the touch pressure may be generated by a finger, a palm, or the like, which is a portion of the body of the user. Also, the pressure sensor 130 may sense a contact surface touched by the user and acquire pressure information of the contact surface.

In an exemplary embodiment, the touch sensor 120 and the pressure sensor 130 may have the substantially same shape to overlap with each other. In another embodiment, the pressure sensor 130 may be provided corresponding to a partial area of the display panel 110. For example, the pressure sensor 130 may be provided in only an area corresponding to the curved surface area DA2.

In this exemplary embodiment, the pressure sensor 130 is located on the touch sensor 120, and, like the touch sensor 120, may be provided in a shape corresponding to that of the display panel 110. Therefore, the pressure sensor 130 includes a flat area corresponding to the flat surface area DA1 and a curved area corresponding to the curved surface area DA2.

When the touch sensor 120 and the pressure sensor 130 are located on the top of the display panel 110, the touch sensor 120 and the pressure sensor 130 may be formed of a transparent material such that the visibility of an image is not deteriorated.

The touch sensor 120 and the pressure sensor 130 will be described in more detail later with reference to FIG. 3.

The window member WIN may be provided on the pressure sensor 130. The window member WIN may be made of an insulative material such as glass or resin. Also, the window member WIN may be made of a material having flexibility or elasticity to be bendable or foldable. The window member WIN may have a single- or multi-layered structure.

The frame part FRM is a component that accommodates and protects the display panel 110, the touch sensor 120, the pressure sensor 130, and the window member WIN. The frame part FRM is located on a back surface of the display panel 110, and may have various shapes for stably fixing and supporting the accommodated components, corresponding to the curved shape of the display panel 110.

The material constituting a portion or the whole of the frame part FRM may be selected from any one or more of various metallic materials such as stainless steel, aluminum, titanium, and copper and synthetic resin materials such as polystyrene, acryl, polyethylene, or silicon, or combinations thereof. However, the exemplary embodiments are not limited thereto.

The display device 100 may further include an adhesive member such as an optically clear adhesive (OCA), which allows the display panel 110, the touch sensor 120, the pressure sensor 130, and the window member WIN to be adhered to each other. In addition, a case where the display panel 110, the touch sensor 120, and the pressure sensor 130 are sequentially stacked is illustrated in FIG. 2A, but the exemplary embodiments are not limited thereto. In some embodiments, the stacking order of the display panel 110, the touch sensor 120, and the pressure sensor 130 may be variously changed.

Referring to FIG. 2B, in a display device 100a according to another exemplary embodiment, the pressure sensor 130 may be located on the display panel 110, and the touch sensor 120 may be located on the pressure sensor 130.

Referring to FIG. 2C, in a display device 100b according to still another exemplary embodiment, the touch sensor 120 may be located on the display panel 110, and the pressure sensor 130 may be located on the back surface of the display panel 110.

Figure 3:
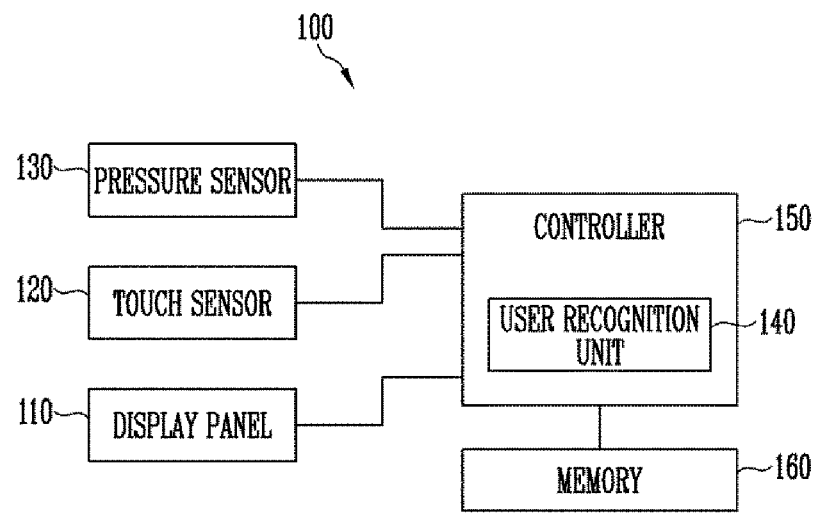
FIG. 3 is a block diagram of the display device shown in FIG. 1.

FIG. 3 is a block diagram of the display device shown in FIG. 1.

Hereinafter, overlapping descriptions of components substantially identical to those of the above-described exemplary embodiment will be omitted to avoid redundancy.

Referring to FIG. 3, the display device 100 may further include a user recognition unit 140, a controller 150, and a memory 160.

The controller 150 may include the user recognition unit 140 as shown in FIG. 3. Further, for example, the controller 150 and/or the user recognition unit 140, may be implemented via one or more general purpose and/or special purpose components, such as one or more discrete circuits, digital signal processing chips, integrated circuits, application specific integrated circuits, microprocessors, processors, programmable arrays, field programmable arrays, instruction set processors, and/or the like. In this manner, the features, functions, processes, etc., described herein may be implemented via software, hardware (e.g., general processor, digital signal processing (DSP) chip, an application specific integrated circuit (ASIC), field programmable gate arrays (FPGAs), etc.), firmware, or a combination thereof. As such, controller 150 and/or the user recognition unit 140, may include or otherwise be associated with the memory 160 including code (e.g., instructions) configured to cause the controller 150 and/or the user recognition unit 140, to perform one or more of the features, functions, processes, etc., described herein.

The user recognition unit 140 may perform user authentication, based on the touch information and the pressure information. Specifically, the user recognition unit 140 may determine whether the touch information acquired from the touch sensor 120 corresponds to previously registered touch information by comparing the touch information with the previously registered touch information. In addition, the user recognition unit 140 may determine whether the pressure information acquired from the pressure sensor 130 corresponds to previously registered pressure information by comparing the pressure information with the previously registered pressure information.

When the touch information acquired from the touch sensor 120 corresponds to the previously registered touch information and when the pressure information acquired from the pressure sensor 130 corresponds to the previously registered pressure information, the user recognition unit 140 may determine that the user is a legal user.

Alternatively, when the touch information acquired from the touch sensor 120 does not correspond to the previously registered touch information and/or when the pressure information acquired from the pressure sensor 130 does not correspond to the previously registered pressure information, the user recognition unit 140 may determine that the user is not a legal user.

In an exemplary embodiment, the user recognition unit 140 may perform the user authentication, based on the touch information and the pressure information, which are acquired through the curved surface area DA2 in the display area DA. To this end, the display device 100 may include a user interface or application that provides an image or picture with respect to the user authentication to the curved surface area DA2 and receives a touch input in the curved surface area DA2 to perform the user authentication.

The controller 150 may comprehensively control the display panel 110, the touch sensor 120, and the pressure sensor 130. Specifically, the controller 150 may control an image display operation of the display panel 110. Also, the controller 150 may allow different control operations to be performed according to the touch information provided from the touch sensor 120 and the pressure information provided from the pressure sensor 130.

In addition, the controller 150 may be configured to include the user recognition unit 140, and perform the user authentication by using the user recognition unit 140. Also, the controller 150 may determine by which finger a touch is input, using the touch information on a fingerprint, and determine a position, strength, area, etc. of the touch pressure, using the pressure information.

In an exemplary embodiment, the controller 150 may control whether the display device 100 is available through the user authentication. For example, if fingerprints of fingers with which the display device 100 is held correspond to previously registered fingerprints, and strengths of touches correspond to previously registered pressure information, the controller 150 may allow the display device 100 to be operated. That is, the controller 150 may control the state of the display device 100 to be changed from a locking state to an activation state.

In an exemplary embodiment, the controller 150 may allow different control operations to be performed for every finger by which a touch is input. For example, the luminance of an image may be controlled if a touch is input by a left thumb, and a scroll function may be controlled if a touch is input by a left index finger.

In addition, although a touch is input by the same finger, the controller 150 may allow different control operations to be performed according to pressure degrees of the touch. For example, when a touch is input by the left thumb, and the pressure degree of the touch is strong, the controller 150 may control the luminance of an image to become bright. When a touch is input by the left thumb, and the pressure degree of the touch is weak, the controller 150 may control the luminance of an image to become dark. In addition, when a touch is input by the left thumb, and the pressure degree of the touch is strong, the controller 150 may control an image to be scrolled down. When a touch is input by the left thumb, and the pressure degree of the touch is weak, the controller 150 may control an image to be scrolled up.

In addition, the controller 150 may allow the above-described operation to be performed only when a touch input is maintained for a preset time or more. For example, the controller 150 may control an image to be scrolled down only when the display device is touched with a strong force for the preset time or more.

The memory 160 stores the previously registered touch information of the user and the previously registered pressure information of the user. Information on previously registered fingerprints in the touch information may include information on fingerprints of all fingers of the user. The user of the display device 100 may previously register, to the display device 100, fingerprints of fingers, force distribution information when the display device 100 is held, holding position information, and the like. In addition, kinds of control operations corresponding to combinations of a finger by which a touch is input, a strength of the touch, an area of the touch, and a rotational movement of the touch.

For example, the memory 160 may be any medium that participates in providing code to the one or more software, hardware, and/or firmware components for execution. Such memories may be implemented in any suitable form, including, but not limited to, non-volatile media, volatile media, and transmission media. Non-volatile media include, for example, optical or magnetic disks. Volatile media include dynamic memory. Transmission media include coaxial cables, copper wire and fiber optics. Transmission media can also take the form of acoustic, optical, or electromagnetic waves. Common forms of computer-readable media include, for example, a floppy disk, a flexible disk, hard disk, magnetic tape, any other magnetic medium, a compact disk-read only memory (CD-ROM), a rewriteable compact disk (CDRW), a digital video disk (DVD), a rewriteable DVD (DVD-RW), any other optical medium, punch cards, paper tape, optical mark sheets, any other physical medium with patterns of holes or other optically recognizable indicia, a random-access memory (RAM), a programmable read only memory (PROM), and erasable programmable read only memory (EPROM), a FLASH-EPROM, any other memory chip or cartridge, a carrier wave, or any other medium from which information may be read by, for example, the controller 150 and/or the user recognition unit 140.

According to the display device 100 according to the exemplary embodiment, as user authentication is performed by using the touch sensor 120 and the pressure sensor 130 together, a security function can be enhanced, and various functions can be provided.

Figure 4:
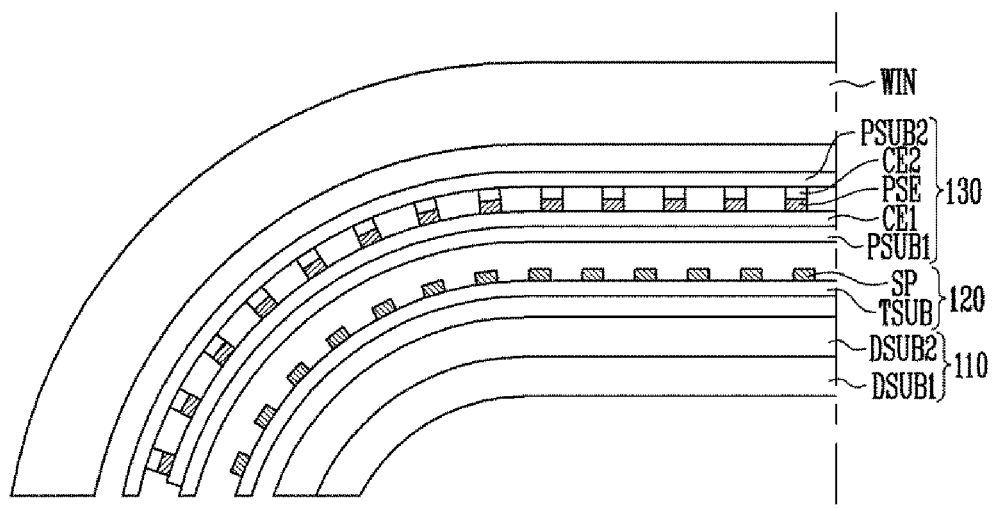
FIG. 4 is a partial sectional view illustrating a detailed configuration of another embodiment of a display device constructed according to the principles of the invention.
Figure 5:
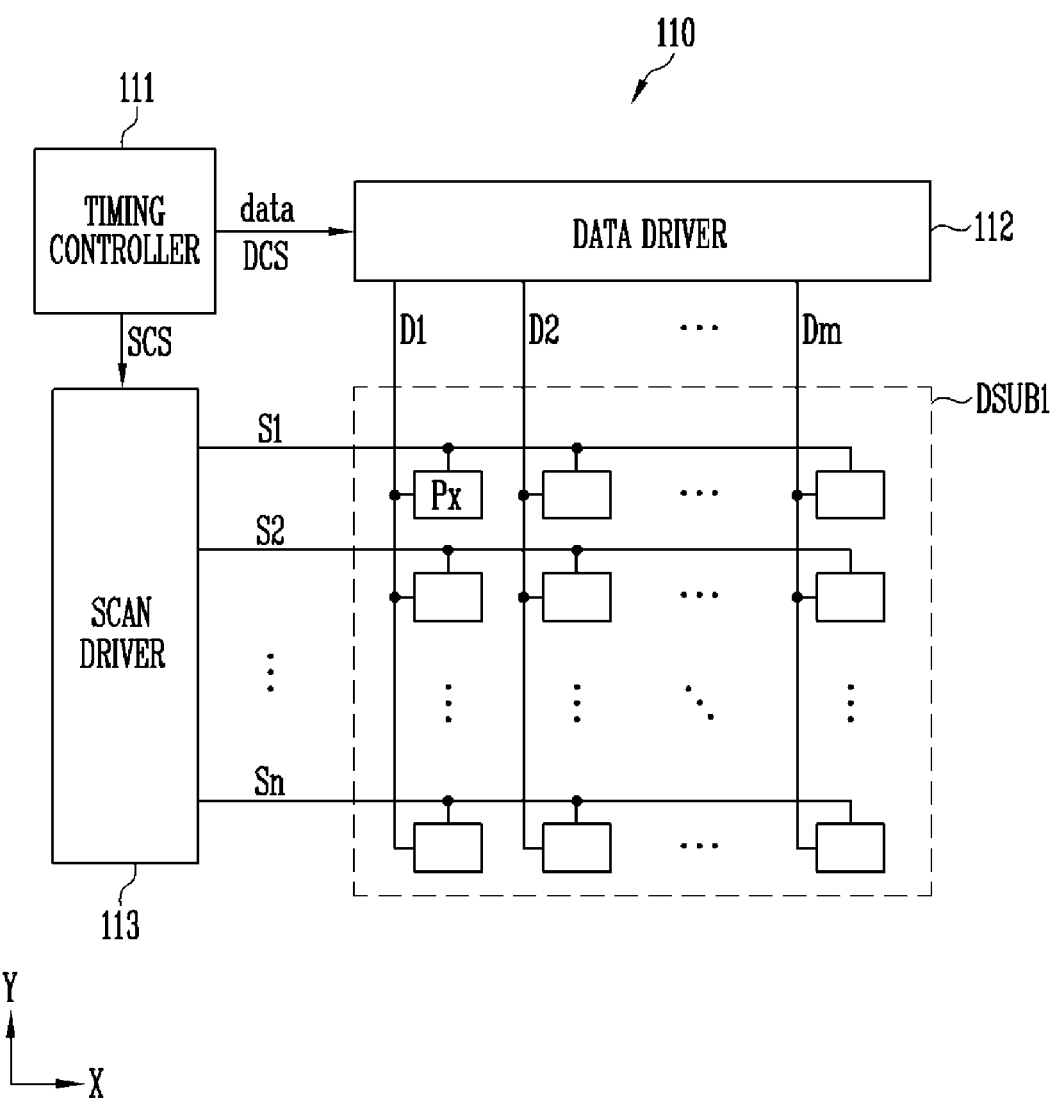
FIG. 5 is a block diagram of an embodiment of a display panel constructed according to the principles of the invention.

FIG. 4 is a partial sectional view illustrating a detailed configuration of another embodiment of a display device constructed according to the principles of the invention. FIG. 5 is a block diagram of an embodiment of a display panel constructed according to the principles of the invention.

Referring to FIGS. 4 and 5, the display panel 110 may include a first substrate DSUB1 and a second substrate DSUB2 that faces the first substrate DSUB1.

A plurality of pixels Px for displaying an image are provided on one surface of the first substrate DSUB1. Each of the pixels Px is a minimum unit for displaying an image, and the pixels Px may be arranged in a matrix form. Each of the pixels Px may emit white light and/or colored light. Each of the pixels Px may be an organic light emitting device including an organic layer. However, the exemplary embodiments are not limited thereto, and each of the pixels Px may be implemented in various forms such as a liquid crystal device, an electrophoretic device, and an electrowetting device.

The first substrate DSUB1 may be made of an insulative material such as glass or resin. Also, the first substrate DSUB1 may be made of a material having flexibility or elasticity to be bendable or foldable. The first substrate DSUB1 may have a single- or multi-layered structure.

For example, the first substrate DSUB1 may include at least one of polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, and cellulose acetate propionate.

However, the material constituting the first substrate DSUB1 may be variously changed, and the base substrate SUB may be made of fiber glass reinforced plastic (FRP), etc.

The second substrate DSUB2 is provided on the first substrate DSUB1 to cover the pixels Px. The second substrate DSUB2 is provided in a single layer, but may be provided in a multi-layer. The second substrate DSUB2 may be made of an organic material and/or an inorganic material. The organic material may include organic insulating materials such as a polyacryl-based compound, a polyimide-based compound, a fluorine-based compound such as Teflon, and a benzocyclobutene-based compound. The inorganic material may include polysiloxane, silicon nitride, silicon oxide, silicon oxynitride, and the like.

The display panel 110 may further include a driving circuit for driving the pixels Px. The driving circuit may include a data driver 112 that supplies a data signal to the pixels Px, a scan driver 113 that supplies a scan signal to the pixel Px, and a timing controller 111 that controls operation timings of the data driver 112 and the scan driver 113. When the driving circuit is formed on a separate chip to be connected to the first substrate DSUB1, the driving circuit may be provided in the form of a chip on glass or a chip on plastic. Alternatively, the driving circuit may be mounted on a separate flexible printed circuit board (FPCB) to be connected to the first substrate DSUB1.

The timing controller 111 may receive image data and synchronization signals, clock signals, and the like, which are used to control the display of the image data. The timing controller 111 corrects image data input from the outside to be suitable for image display, and supplies the corrected data data to the data driver 112. The timing controller 111 may output a data control signal DCS for controlling the operation timing of the data driver 112 and a scan control signal SCS for controlling the operation timing of the scan driver 113.

The data driver 112 is connected to data lines D1 to Dm, and supplies a data signal to the pixels Px through the data lines D1 to Dm. The data driver 112 converts the data data supplied from the timing controller 111 into an analog data signal (or voltage). Specifically, the data driver 112 outputs a gray level voltage corresponding to the data data in response to the data control signal DCS.

The scan driver 113 is connected to scan lines S1 to Sn, and supplies a scan signal to the pixels Px through the scan lines S1 to Sn. Specifically, the scan driver 113 outputs the scan signal while shifting the voltage of a gate voltage in response to the scan control signal SCS. In an embodiment, the scan driver 113 may be configured with a plurality of stage circuits, and sequentially supply the scan signal to the scan lines S1 to Sn.

The scan lines S1 to Sn may extend in a first direction (e.g., an X-axis direction) to be connected to the pixels Px in units of lines, and the data lines D1 to Dm may extend in a second direction (e.g., a Y-axis direction) to be connected to pixels Px in units of lines.

The pixels Px display an image, corresponding to the data signal supplied from the data driver 112 and the scan signal supplied from the scan driver 113. Specifically, pixels Px are selected in a horizontal line unit, corresponding to a scan signal supplied to any one of the scan lines S1 to Sn. At this time, each of the pixels Px selected by the scan signal is supplied with a data signal from the data line (any one of D1 to Dm) connected thereto. Each of the pixels Px supplied with the data signal emits light with a predetermined luminance corresponding to the data signal.

Figure 6:
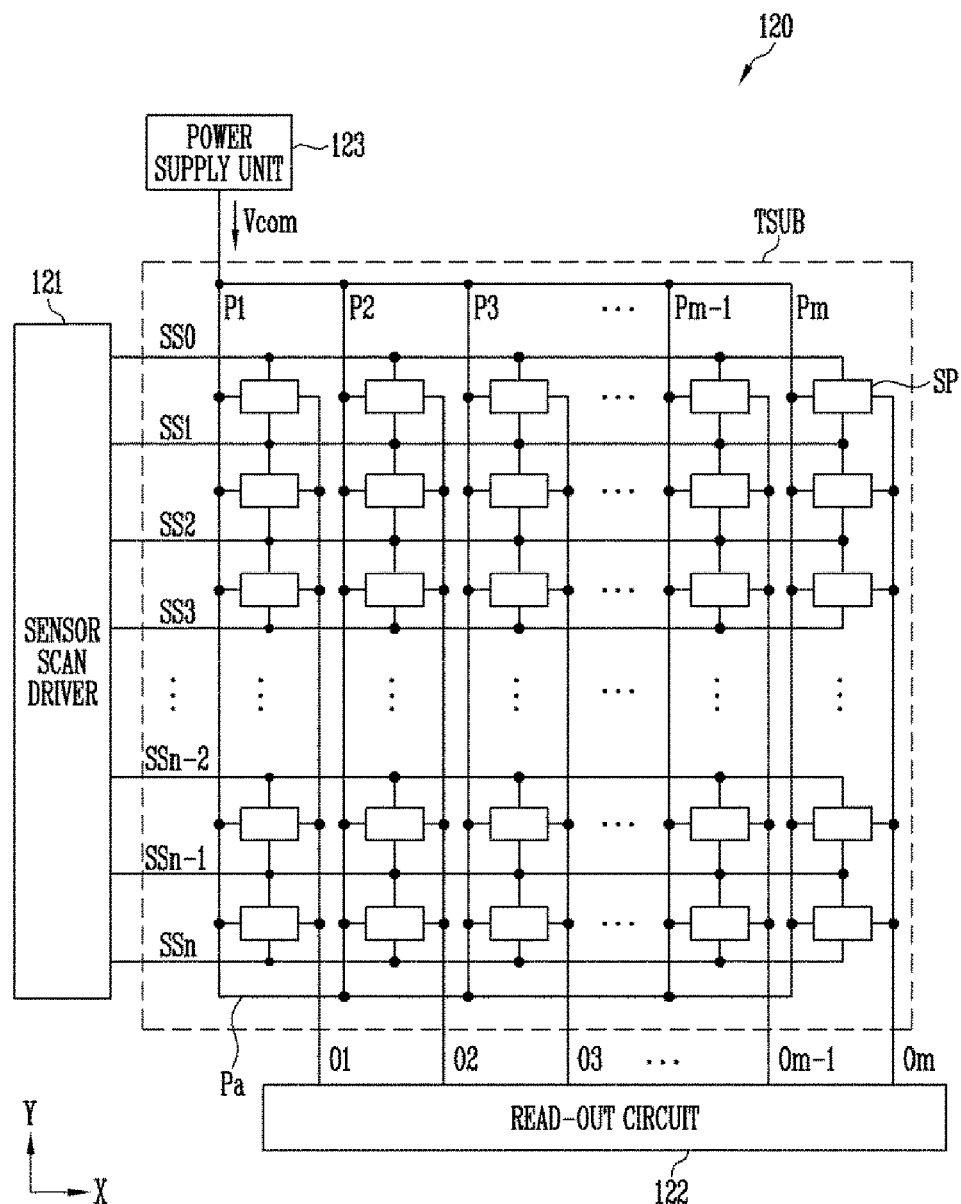
FIG. 6 is a block diagram of an embodiment of a touch sensor constructed according to the principles of the invention.

FIG. 6 is a block diagram of an embodiment of a touch sensor constructed according to the principles of the invention.

Referring to FIGS. 4 and 6, the touch sensor 120 may include a touch sensor substrate TSUB and a plurality of sensor pixels SP that sense a change in capacitance corresponding to a touch of the user. Also, the touch sensor 120 may further include a sensor scan driver 121 for driving the sensor pixels SP, a read-out circuit 122, and a power supply unit 123.

The touch sensor substrate TSUB may be made of an insulative material such as glass or resin. Also, the touch sensor substrate TSUB may be made of a material having flexibility or elasticity to be bendable or foldable. The touch sensor substrate TSUB may have a single- or multi-layered structure.

For example, the touch sensor substrate TSUB may include at least one of polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, and cellulose acetate propionate.

However, the material constituting the touch sensor substrate TSUB may be variously changed, and the touch sensor substrate TSUB may be made of fiber glass reinforced plastic (FRP), etc.

The sensor pixels SP may be located on the touch sensor substrate TSUB. Also, the sensor pixels SP may be connected to sensor scan lines SS0 to SSn and output lines O1 to Om.

The sensor pixels SP may receive a sensor scan signal input through the sensor scan lines SS0 to SSn. The sensor pixels SP may output, to the output lines O1 to Om, a predetermined output current corresponding to a touch state during a period in which the sensor scan signal is supplied.

The sensor scan lines SS0 to SSn may be located on the touch sensor substrate TSUB, and extend in a first direction (e.g., an X-axis direction) to be connected to the sensor pixels SP in units of lines.

The output lines O1 to Om may be located on the touch sensor substrate TSUB, and extend in a second direction (e.g., a Y-axis direction) to be connected to the sensor pixels SP in units of lines.

In addition, the sensor pixels SP may be connected to reference voltage lines P1 to Pm, and be supplied with a reference voltage Vcom through the reference voltage lines P1 to Pm.

The reference voltage lines P1 to Pm may extend in the second direction and be connected to the sensor pixels SP in units of lines. For example, the reference voltage lines P1 to Pm may be arranged in parallel to the output lines O1 to Om.

However, the arrangement direction of the reference voltage lines P1 to Pm may be variously changed. For example, the reference voltage lines P1 to Pm may be arranged in parallel to the sensor scan lines SS0 to SSn.

The reference voltage lines P1 to Pm may be electrically connected to each other so as to maintain the same potential. For example, the reference voltage lines P1 to Pm may be electrically connected to each other through a separate line Pa at an outer portion of the touch sensor substrate TSUB.

The sensor scan driver 112 may supply the sensor scan signal to the sensor pixels SP through the sensor scan lines SS0 to SSn. For example, the sensor scan driver 112 may sequentially output the sensor scan signal to the sensor scan lines SS0 to SSn.

The sensor scan signal may have a voltage level that enables a transistor supplied with the sensor scan signal to be turned on.

In order for the sensor scan driver 121 to be connected to the sensor scan lines SS0 to SSn, the sensor scan driver 121 may be directly mounted on the touch sensor substrate TSUB or be connected to the touch sensor substrate TSUB through a separate component such as a flexible printed circuit board.

The read-out circuit 122 may receive a signal (e.g., an output current) output from the sensor pixels SP through the output lines O1 to Om.

For example, when the sensor scan driver 121 sequentially supplies the sensor scan signal, the sensor pixels SP are selected units of lines, and the read-out circuit 122 may sequentially receive output currents from the sensor pixels SP in units of lines.

In this case, the read-out circuit 122 may current touch information by sensing a variation in output current.

For example, the touch information may include at least one of a position of a touch generated in the touch sensor 120, a pressure applied by the touch, and valleys and ridges included in a fingerprint.

In order for the read-out circuit 122 to be connected to the output lines O1 to Om, the read-out circuit 122 may be directly mounted on the touch sensor substrate TSUB or be connected to the touch sensor substrate TSUB through a separate component such as a flexible printed circuit board.

The power supply unit 123 may supply the reference voltage Vcom to the sensor pixels SP through the reference voltage lines P1 to Pm.

In order for the power supply unit 123 to be connected to the reference voltage lines P1 to Pm, the power supply unit 123 may be directly mounted on the touch sensor substrate TSUB or be connected to the touch sensor substrate TSUB through a separate component such as a flexible printed circuit board.

In FIG. 6, it is illustrated that the sensor scan driver 121, the read-out circuit 122, and the power supply unit 123 are individually provided, but at least some of the components may be integrated, if necessary.

In addition, the sensor scan driver 121, the read-out circuit 122, and the power supply unit 123 may be installed in various ways including chip on glass, chip on plastic, tape carrier package, chip on film, and the like.

By the touch sensor 120 including the sensor pixels SP, the display device 100 can provide improved sensing performance in the curved surface area DA2 of the display panel 110, as compared with when a mutual capacitive touch sensor is employed.

Figure 7:
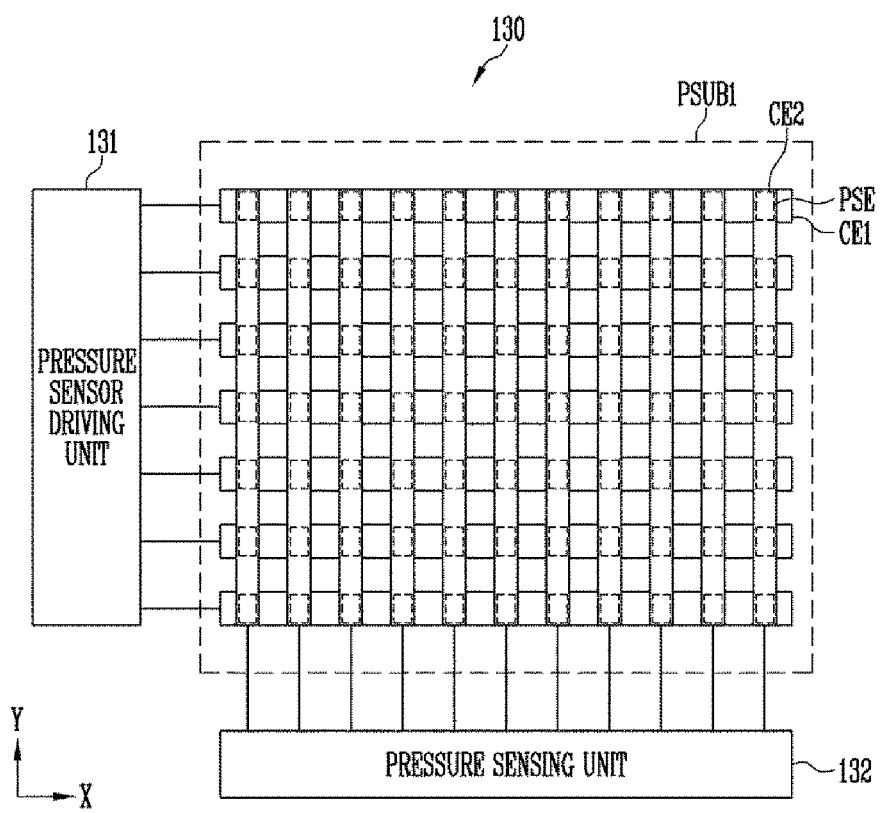
FIG. 7 is a block diagram of an embodiment of a pressure sensor constructed according to the principles of the invention.

FIG. 7 is a block diagram of an embodiment of a pressure sensor constructed according to the principles of the invention.

Referring to FIGS. 4 and 7, the pressure sensor 130 may include a first pressure sensor substrate PSUB1, a first electrode CE1 provided on the first pressure sensor substrate PSUB1, a second electrode CE2 spaced apart from the first electrode CE1, a pressure sensing element PSE provided between the first electrode CE1 and the second electrode CE2, and a second pressure sensor substrate PSUB2 provided on the second electrode CE2.

The first pressure sensor substrate PSUB1 and the second pressure sensor substrate PSUB2 may be made of an insulative material such as glass or resin. Also, the first pressure sensor substrate PSUB1 and the second pressure sensor substrate PSUB2 may be made of a material having flexibility or elasticity to be bendable or foldable. The first pressure sensor substrate PSUB1 and the second pressure sensor substrate PSUB2 may have a single- or multi-layered structure.

For example, the first pressure sensor substrate PSUB1 and the second pressure sensor substrate PSUB2 may include at least one of polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, and cellulose acetate propionate.

The first electrode CE1 may extend long in a first direction (e.g., an X-axis direction) and be arranged in plural numbers along a second direction (e.g., a Y-axis direction) intersecting the first direction. The second electrode CE2 may extend long in the second direction to intersect the first electrode CE1 and be arranged in plural numbers along the first direction.

In this exemplary embodiment, a case where the first electrode CE1 and the second electrode CE2 have a substantially elongate, bar shape is described as an example. However, the exemplary embodiments are not limited thereto, and the first electrode CE1 and the second electrode CE2 may be modified to have various shapes.

The first electrode CE1 and the second electrode CE2 may be spaced apart from each other. In addition, a separate component may be located between the first electrode CE1 and the second electrode CE2.

The first electrode CE1 and the second electrode CE2 may include a conductive material. The conductive material may include metals or any alloy thereof. The metals may include gold (Au), silver (Ag), aluminum (Al), molybdenum (Mo), chromium (Cr), titanium (Ti), nickel (Ni), neodymium (Nd), copper (Cu), platinum (Pt), and the like.

In an exemplary embodiment, the first electrode CE1 and the second electrode CE2 may be made of a transparent conductive material. The transparent conductive material may include silver nanowire (AgNW), indium tin oxide (ITO), indium zinc oxide (IZO), antimony zinc oxide (AZO), indium tin zinc oxide (ITZO), zinc oxide (ZnO), tin oxide ($SnO_2$), carbon nano tube, graphene, and the like. Each of the first electrode CE1 and the second electrode CE2 may be formed in a single layer or multiple layers. For example, each of the first electrode CE1 and the second electrode CE2 may include a multi-layer in which two or more materials among the above-described materials are stacked. In addition, the second electrode CE2 may be made of a material identical to or different from that of the first electrode CE1.

The pressure sensing element PSE may be partially located at an intersection portion of the first electrode CE1 and the second electrode CE2. The number of pressure sensing elements PSE has influence on the touch resolution of the pressure sensor 130. Therefore, as the number of intersection portions increases, the touch resolution may increase.

The pressure sensing element PSE is a component having electrical characteristics that are changed depending on the degree of deformation thereof, and the resistance of the pressure sensing element PSE may be changed corresponding to the pressure (or force) applied from the outside. The pressure sensing element PSE may include a quantum tunneling composite (QTC).

For example, as the force provided to the pressure sensing device PSE increases, the resistance of the sensing element PSE may decrease. Alternatively, on the contrary, as the force provided to the pressure sensing device PSE increases, the resistance of the sensing element PSE may increase.

The pressure sensing elements PSE may be arranged at various positions and/or various densities per unit area according to a size of the sensor or a touch aspect of the user. For example, when there exist an area in which a touch is frequently generated and an area in which the touch is not frequently generated, a large number of pressure sensing element PSE may be arranged in the area in which the touch is frequently generated so as to increase the touch sensitivity of the area in which the touch is frequently generated, and pressure sensing elements PSE of which number is smaller than that of pressure sensing elements PSE when the touch is frequently generated may be arranged in the area in which the touch is not frequently generated.

The pressure sensor 130 may further include a pressure sensor driving unit 131 that supplies a driving signal to the first electrode CE1 and a pressure sensing unit 132 that senses a change in resistance of the pressure sensing element PSE.

The pressure sensor driving unit 131 may be connected to a plurality of first electrodes CE1 and sequentially supply a driving signal to the plurality of first electrodes CE1. The driving signal may be a voltage having a specific level. The pressure sensing unit 132 may be connected to a plurality of second electrodes CE2 and sequentially read out the plurality of second electrodes CE2. The pressure sensing unit 132 may determine a change in resistance of the pressure sensing element PSE, based on electrical characteristic vales sensed by the second electrode CE2. Also, the pressure sensing unit 132 may determine the magnitude of a touch pressure corresponding to the change in resistance of the pressure sensing element PSE.

In FIG. 7, it is illustrated that the pressure sensor driving unit 131 and the pressure sensing unit 132 are individually provided, but at least some of the components may be integrated, if necessary. In addition, the pressure sensor driving unit 131 and the pressure sensing unit 132 may be installed in various ways including chip on glass, chip on plastic, tape carrier package, chip on film, and the like.

Figure 8A:
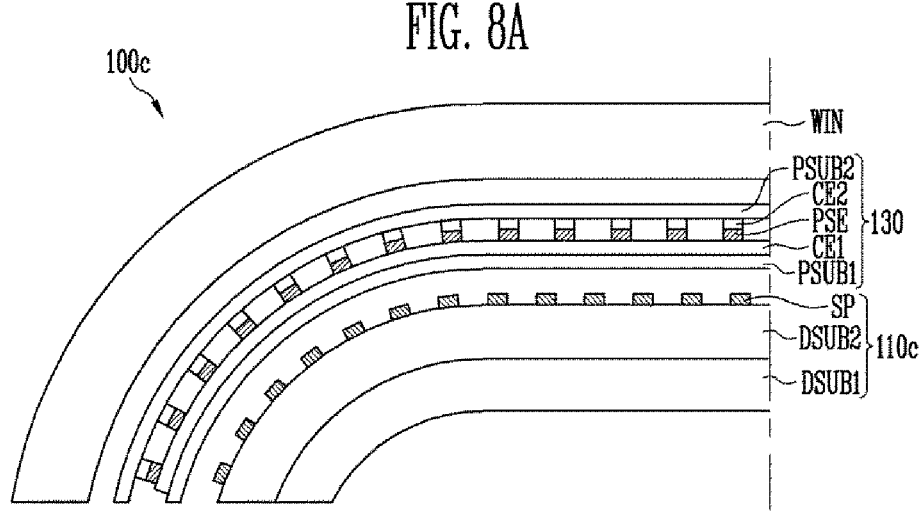
FIGS. 8A, 8B, and 8C are partial sectional views of display devices according to still other exemplary embodiments.
Figure 8B:
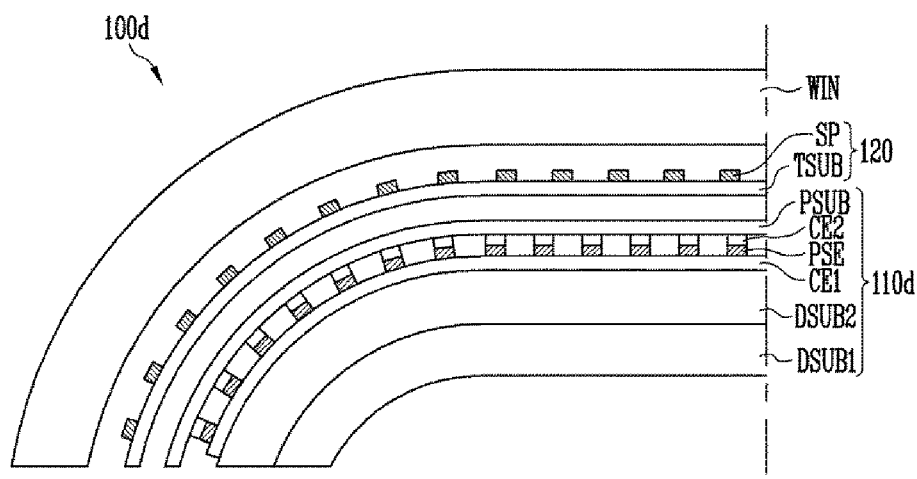
Figure 8C:
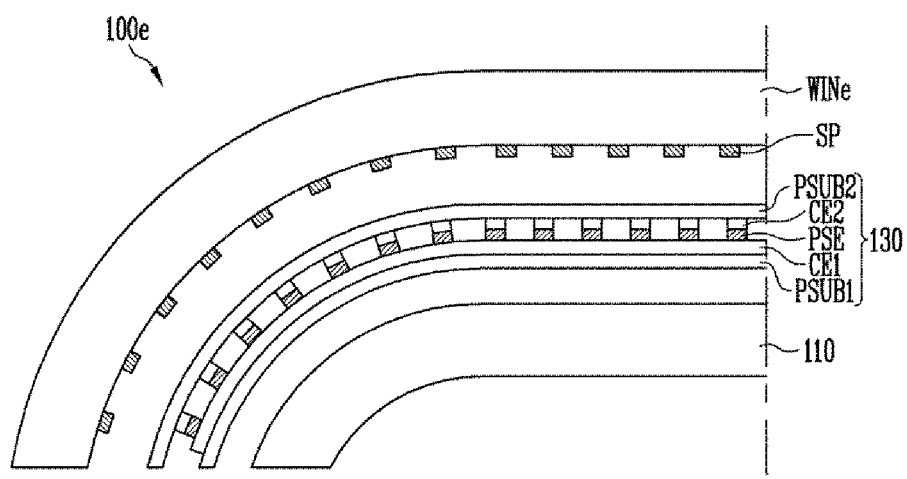

FIGS. 8A, 8B, and 8C are partial sectional views of display devices according to still other exemplary embodiments.

In the above-described exemplary embodiments, a case where the touch sensor substrate TSUB of the touch sensor 120 and the first pressure sensor substrate PSUB1 of the pressure sensor 130 are implemented as individual substrates is described as an example, but the touch sensor substrate TSUB and the first pressure sensor substrate PSUB1 may be implemented with various components included in the display device 100.

Referring to FIG. 8A, a display device 100c according to still another exemplary embodiment may include a touch sensor integrated display panel 110c. In the touch sensor integrated display panel 110c, the sensor pixels SP are directly formed on the second substrate DSUB2. That is, the second substrate DSUB2 that is an upper substrate of the touch sensor integrated display panel 110c substitutes for the touch sensor substrate TSUB.

Referring to FIG. 8B, a display device 100d according to still another exemplary embodiment disclosure may include a pressure sensor integrated display panel 110d. In the pressure sensor integrated display panel 110d, the first electrode CE1 is directly formed on the second substrate DSUB2. In addition, the pressure sensing element PSE, the second electrode CE2, and the pressure sensor substrate PSUB are sequentially stacked on the first electrode CE1.

That is, the second substrate DSUB2 that is an upper substrate of the pressure sensor integrated display panel 110d substitutes for the first pressure sensor substrate PSUB1.

Referring to FIG. 8C, a display device 100e according to still another exemplary embodiment may include a touch sensor integrated window member WINe. In the touch sensor integrated window member WINe, the sensor pixels SP are directly formed on the touch sensor integrated window member WINe. That is, the touch sensor integrated window member WINe substitutes for the touch sensor substrate TSUB.

As described above, according to the principles and exemplary embodiments of the invention, the touch sensor and the pressure sensor are integrated together to provide improved sensitivity in the curved surface area(s) of the display panel, thereby ensuring more stable and uniform sensing. Further, user authentication can be performed by sensing a touch and a pressure in the curved surface area.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements.

What is claimed is:

1. A display device comprising:
   a display panel including a display area including at least a partially curved surface area;
   a touch sensor overlapping the display area to acquire touch information on a touch of a user, the touch information including information on at least one part of a user selected from the group of lines of a knuckle of the user, lines of a palm of the user, a fingerprint of the user, and a position of the touch of the user, wherein the at least one part comprises at least two parts with at least one of the two parts being sensed from spaced curved locations on the display;
   a pressure sensor to sense a pressure of the touch; and
   a controller configured to perform user authentication by controlling the display panel, the touch sensor, and the pressure sensor,
   wherein the touch sensor includes a plurality of sensor pixels to sense a change in capacitance corresponding to the touch,
   wherein the pressure sensor includes:
   a first electrode;
   a second electrode spaced apart from the first electrode; and
   a pressure sensing element provided between the first electrode and the second electrode.

2. The display device of claim 1, wherein the resistance of the pressure sensing element is changed based on the pressure.

3. The display device of claim 2, wherein the pressure sensing element is a quantum tunneling composite (QTC).

4. The display device of claim 1, wherein the pressure sensor senses a contact surface touched by the user and acquires pressure information of the contact surface and the controller comprises a user recognition unit performing user authentication based on the touch information and the pressure information.

5. The display device of claim 4, wherein the user recognition unit is configured to perform the user authentication based on the touch information and the pressure information, which are acquired through the curved surface area in the display area.

6. The display device of claim 4, wherein the user recognition unit is configured to perform the user authentication by comparing the touch information with previously registered touch information and comparing the pressure information with previously registered pressure information.

7. The display device of claim 6, further comprising a memory to store the previously registered touch information of the user and the previously registered pressure information of the user.

8. The display device of claim 4, wherein the controller is further configured to control whether the display device is available through the user authentication.

9. The display device of claim 1, wherein the touch sensor further includes:
   a sensor scan driver to supply a sensor scan signal to sensor scan lines connected to the sensor pixels; and
   a read-out circuit to recognize the touch information by using a current output through output lines connected to the sensor pixels.

10. The display device of claim 1, wherein the pressure sensor further includes:
    a pressure sensor driving unit to supply a driving signal to the first electrode; and
    a pressure sensing unit to sense a change in resistance of the pressure sensing element.

11. The display device of claim 1, wherein the touch sensor is provided on a curved surface of the display panel, and the pressure sensor is provided on the touch sensor.

12. The display device of claim 1, wherein the pressure sensor is provided on a curved surface of the display panel, and the touch sensor is provided on the pressure sensor.

13. The display device of claim 1, further comprising a window member provided on the display panel.

14. The display device of claim 13, wherein the sensor pixels are directly formed on the window member.

15. A display device comprising:
    a display panel including a display area including at least a partially curved surface area;
    a touch sensor overlapping the display area to acquire touch information on a touch of a user;
    a pressure sensor to sense a pressure of the touch; and
    a controller configured to perform user authentication by controlling the display panel, the touch sensor, and the pressure sensor,
    wherein the touch sensor includes a plurality of sensor pixels that senses a change in capacitance corresponding to the touch,
    wherein the pressure sensor includes:
    a first electrode;
    a second electrode spaced apart from the first electrode; and
    a pressure sensing element provided between the first electrode and the second electrode,
    wherein the display panel is provided between the touch sensor and the pressure sensor.

16. A display device comprising:
    a display panel including a display area including at least a partially curved surface area;
    a touch sensor overlapping the display area to acquire touch information on a touch of a user;
    a pressure sensor to sense a pressure of the touch; and
    a controller configured to perform user authentication by controlling the display panel, the touch sensor, and the pressure sensor, wherein the touch sensor includes a plurality of sensor pixels that senses a change in capacitance corresponding to the touch, wherein the pressure sensor includes:

a first electrode;

a second electrode spaced apart from the first electrode; and a pressure sensing element provided between the first electrode and the second electrode, and wherein the display panel includes a first substrate and a second substrate that faces the first substrate, and the sensor pixels are directly formed on the second substrate.

17. The display device of claim 16, wherein the first electrode is directly formed on the second substrate.

* * * * *